US010530725B2

(12) United States Patent
Ramaswamy et al.

(10) Patent No.: US 10,530,725 B2
(45) Date of Patent: Jan. 7, 2020

(54) ARCHITECTURE FOR LARGE DATA MANAGEMENT IN COMMUNICATION APPLICATIONS THROUGH MULTIPLE MAILBOXES

(71) Applicant: MICROSOFT TECHNOLOGY LICENSING, LLC, Redmond, WA (US)

(72) Inventors: Dheepak Ramaswamy, Bellevue, WA (US); Sanjay Ramaswamy, Redmond, WA (US); Le-Wu Tung, Redmond, WA (US); Song Yang, Redmond, WA (US); Julian Zbogar-Smith, Redmond, WA (US); Gagandeep Kohli, Redmond, WA (US); Sowmy Srinivasan, Redmond, WA (US); Kamal Janardhan, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 495 days.

(21) Appl. No.: 14/737,458

(22) Filed: Jun. 11, 2015

(65) Prior Publication Data

US 2016/0269339 A1 Sep. 15, 2016

Related U.S. Application Data

(60) Provisional application No. 62/130,475, filed on Mar. 9, 2015.

(51) Int. Cl.
*G06F 15/16* (2006.01)
*H04L 12/58* (2006.01)
*G06Q 10/10* (2012.01)
(52) U.S. Cl.
CPC ........... *H04L 51/22* (2013.01); *G06Q 10/107* (2013.01)

(58) Field of Classification Search
CPC ............................. H04L 51/22; G06Q 10/107
(Continued)

(56) References Cited

U.S. PATENT DOCUMENTS 5,997,168 A * 12/1999 Harper ................. G05B 19/042
700/86
6,360,272 B1 3/2002 Lincke et al.
(Continued)

FOREIGN PATENT DOCUMENTS

EP 0840491 A1 5/1998
EP 1689137 A1 8/2006

OTHER PUBLICATIONS

"International Preliminary Report on Patentability Issued in PCT Application No. PCT/US2016/021415", dated May 26, 2017, 9 Pages.
(Continued)

*Primary Examiner* — Anthony Mejia
(74) *Attorney, Agent, or Firm* — Michael Best & Friedrich LLP

(57) ABSTRACT

Technologies are described to increase a data limit for a user by introducing additional archive mailboxes as the original archive fills up or subsequently added archive mailboxes fill up. Thus, a user's data limit may be effectively removed through the use of additional archive mailboxes. In some examples, the additional mailboxes may be integrated into the architecture of the communication application such that their use is transparent to the user and/or an administrator of the communication application or associated service through the use of an application programming interface (API) that exposes a single multivalued strongly typed collection instead of dealing with multiple attributes and extending the schema every time a new type needs to be added. A mailbox locations attribute may act as the main storage of serialized (Continued)

mailbox locations and a mailbox identifier attribute may be used for indexing.

18 Claims, 10 Drawing Sheets

(58) Field of Classification Search
USPC .......................................................... 709/206
See application file for complete search history.

(56) References Cited

U.S. PATENT DOCUMENTS

| | | | |
|---|---|---|---|
| 6,396,513 | B1 | 5/2002 | Helfman et al. |
| 6,678,705 | B1* | 1/2004 | Berchtold ............... G06Q 10/10 |
| 6,779,019 | B1* | 8/2004 | Mousseau ............... H04W 4/02 |
| | | | 709/206 |
| 7,136,897 | B1* | 11/2006 | Raghunandan ........ G06Q 10/00 |
| | | | 709/206 |
| 7,505,571 | B2 | 3/2009 | Bhatia et al. |
| 7,743,019 | B2 | 6/2010 | Shah et al. |
| 7,796,977 | B2* | 9/2010 | Vander Veen ...... H04M 1/7255 |
| | | | 379/88.18 |
| 7,913,053 | B1* | 3/2011 | Newland ............... G06Q 10/107 |
| | | | 173/165 |
| 8,131,809 | B2* | 3/2012 | Consul .................. G06Q 10/107 |
| | | | 709/206 |
| 8,140,604 | B2* | 3/2012 | Ingen .................. G06F 11/1448 |
| | | | 707/821 |
| 8,214,437 | B1* | 7/2012 | Alspector ............... H04L 51/12 |
| | | | 709/206 |
| 8,285,799 | B2 | 10/2012 | Edelen |
| 8,301,662 | B2* | 10/2012 | Lavoie .................. G06Q 10/00 |
| | | | 707/796 |
| 8,326,932 | B2* | 12/2012 | Khan ...................... H04L 51/00 |
| | | | 709/206 |
| 8,380,675 | B1* | 2/2013 | Dwivedi ............... G06Q 10/107 |
| | | | 707/661 |
| 8,447,817 | B2 | 5/2013 | Lavoie et al. |
| 8,745,232 | B2 | 6/2014 | Parthasarathy et al. |
| 8,775,509 | B2 | 7/2014 | Dirstine et al. |
| 8,843,452 | B2 | 9/2014 | Baessler et al. |
| 8,849,929 | B2 | 9/2014 | Lindsay et al. |
| 8,935,213 | B2 | 1/2015 | Baessler et al. |
| 9,152,685 | B2* | 10/2015 | Kavuri .................. G06F 3/0647 |
| 9,317,417 | B2* | 4/2016 | Lemus .................... G06F 12/00 |
| 2003/0023692 | A1 | 1/2003 | Moroo |
| 2003/0151623 | A1* | 8/2003 | Shimada ............... G06Q 10/107 |
| | | | 715/752 |
| 2003/0208608 | A1* | 11/2003 | Merriam ............... G06Q 10/107 |
| | | | 709/229 |
| 2004/0102957 | A1* | 5/2004 | Levin .................. G06F 17/2735 |
| | | | 704/3 |
| 2004/0131081 | A1 | 7/2004 | Bhatia et al. |
| 2004/0221048 | A1* | 11/2004 | Ogier .................... G06Q 10/107 |
| | | | 709/229 |
| 2005/0144520 | A1 | 6/2005 | Tuma et al. |
| 2006/0080354 | A1* | 4/2006 | Berger .................... G06F 16/20 |
| 2006/0112166 | A1* | 5/2006 | Pettigrew ............. G06Q 10/107 |
| | | | 709/206 |
| 2007/0180033 | A1* | 8/2007 | Singh ................... G06Q 10/107 |
| | | | 709/206 |
| 2007/0244996 | A1* | 10/2007 | Ahmed ................. G06O 10/107 |
| | | | 709/220 |
| 2008/0077676 | A1* | 3/2008 | Nagarajan ............ G06Q 10/107 |
| | | | 709/206 |
| 2008/0109448 | A1* | 5/2008 | Aboel-Nil ............ G06Q 10/107 |
| 2008/0126442 | A1 | 5/2008 | Cisler et al. |
| 2008/0288598 | A1* | 11/2008 | French ................. G06Q 10/107 |
| | | | 709/206 |
| 2009/0037359 | A1 | 2/2009 | Callanan et al. |
| 2009/0234911 | A1* | 9/2009 | Khavari ............... G06Q 10/107 |
| | | | 709/203 |
| 2010/0145932 | A1* | 6/2010 | Rook .................... G06Q 10/107 |
| | | | 707/722 |
| 2010/0161737 | A1* | 6/2010 | Consul ................. G06Q 10/107 |
| | | | 709/206 |
| 2010/0217805 | A1* | 8/2010 | Lavoie ................. G06Q 10/107 |
| | | | 709/206 |
| 2011/0231371 | A1* | 9/2011 | Logan ................... H04L 67/303 |
| | | | 707/668 |
| 2011/0264630 | A1* | 10/2011 | Edelen .................... H04L 51/14 |
| | | | 707/665 |
| 2012/0109898 | A1 | 5/2012 | Baessler et al. |
| 2012/0259817 | A1* | 10/2012 | Baessler .............. G06Q 10/107 |
| | | | 707/665 |
| 2012/0303718 | A1* | 11/2012 | Chen ....................... H04L 51/04 |
| | | | 709/206 |
| 2013/0212200 | A1* | 8/2013 | Dennis .................... H04L 51/22 |
| | | | 709/206 |
| 2014/0181443 | A1 | 6/2014 | Kottomtharayil et al. |
| 2016/0269338 | A1 | 9/2016 | Ramaswamy et al. |

OTHER PUBLICATIONS

"Exchange 2010—How to access the Archived Content Using API", Retrieved From <<http://stackoverflow.com/questions/3662511/exchange-2010-how-to-access-the-archived-content-using-api>>, Feb. 23, 2011, 1 Page.

McBee, et al., "Microsoft Exchange Server 2007: Implementation and Administration", in Book Microsoft® Exchange Server 2007: Implementation and Administration, John Wiley & Sons, Feb. 28, 2008, 1 Page.

Cunningham, Paul, "How to Create an Archive Mailbox in Exchange Server 2010", Retrieved from <<http://exchangeserverpro.com/create-archive-mailbox-exchange-server-2010/>>, Nov. 20, 2010, 17 Pages.

"Windows PowerShell-Wikipedia, the Free Encyclopedia", Retrieved from <<https://en.wikipedia.org/w/index.php?title=Windows_PowerShell&oldid=647876618>>, Feb. 19, 2015, 30 Pages.

"Archive Manager Restful Web Service API", Retrieved from <<http://support-public.cfm.software.dell.com/1174_api_reference.pdf>>, Jan. 31, 2013, 6 Pages.

"International Search Report and Written Opinion Issued in PCT Application No. PCT/US2016/021415", dated May 11, 2016, 12 Pages.

"Accessing Exchange 2010 Mailbox Move History Data", Retrieved from https://thoughtsofanidlemind.com/2010/09/13/exchange2010-move-history/, Sep. 13, 2010, 13 Pages.

"Cloud-Based Email Archiving: A Practical Guide", Retrieved from https://whitepapers.em360tech.com/wp-content/files_mf/white_paper/wp_letter_archive_01_13_11.pdf, Dec. 13, 2011, 12 Pages.

"EMC ATMOS and Commvault Simpana 9 Archive Solution Brief", Retrieved from https://community.emc.com/servlet/JiveServlet/downloadBody/11123-102-1-43883/EMC+&cd=2&hl=en&ct=clnk&gl=in, Jul. 2011, 3 Pages.

"Second Written Opinion Issued in PCT Application No. PCT/US2016/021286", dated Oct. 31, 2016, 7 Pages.

"In-Place Archiving in Exchange 2013", Retrieved from https://technet.microsoft.com/en-us/library/dd979800%28v=exchg.150%29.aspx, Mar. 15, 2013, 7 Pages.

Spurzem, Bob, "Solve Exchange Storage Problems Once and for All", Retrieved from http://www.ironmountain.ro/~/media/FEE836518DFE4B519197650DA8605151.pdf, Apr. 2008, 8 Pages.

"Mailbox Management", Retrieved from https://web.archive.org/web/20140106112612/http://www.cgsinc.com/en/software/unlimited-mailbox/solutions/mailbox-management, Jan. 6, 2014, 2 Pages.

"Orca Virtual Email Archiving Appliance", Retrieved from https://web.archive.org/web/20150317102100/http://www.intradyn.com:80/products/orca-virtual-email-archiver/, Retrieved on Mar. 10, 2015, 4 Pages.

"Scaling Email Archives", Retrieved from https://msft.spoppe.com/teams/IPaed/Specs/Unlimited Mailbox/Scaling Email Archives.pptx?d=wb1 0262ebce3a4996b5bb931 cc9b 7fe8b, Retrieved on Mar. 13, 2015, 47 Pages.

(56) References Cited

OTHER PUBLICATIONS

"Symantec Enterprise Vault™ for Lotus Domino®", Retrieved from http://www.dell.com/downloads/global/solutions/vslc/symantec_ent_vault75.pdf, Retrieved on Mar. 10, 2015, 5 Pages.
"Final Office Action Issued in U.S. Appl. No. 14/737,454", dated Jul. 9, 2018, 31 Pages.
"Non Final Office Action Issued in U.S. Appl. No. 14/737,454", dated Sep. 7, 2017, 33 Pages.
"Office Action Issued in European Patent Application No. 16710620.2", dated Jul. 16, 2018, 7 Pages.
"Office Action Issued in European Patent Application No. 16711454.5", dated Jul. 16, 2018, 7 Pages.
"International Preliminary Report on Patentability Issued in PCT Application No. PCT/US2016/021286", dated May 23, 2017, 8 Pages.
"International Search Report and Written Opinion Issued in PCT Application No. PCT/US2016/021286", dated May 11, 2016, 11 Pages.
"HP Email Archiving Software for Lotus Domino 2.1", In QuickSpecs, Worldwide, Version 8, Oct. 15, 2010, 7 Pages.
"Life after Lotus Notes", Retrieved from https://web.archive.org/web/20111026134834/http://www.ouboces.org/bmail/LifeAfterNotes.pdf, Retrieved on Mar. 10, 2015, 16 Pages.
Srinivasan, Sowmy, "Archive Multi Mailbox", Retrieved from https://msft.spoppe.com/teams/IPaed/Specs/Unlimited_Mailbox/Large_Mailbox_(Dev_Doc).docx?d=w6ab3989f5047424c89e78de33d22c400, Retrieved on Mar. 13, 2015, 20 Pages.
"MailStore Server", In White Paper, Apr. 1, 2014, 11 pages.
"MailStore Server 7 Technical Specifications", In White Paper, Oct. 4, 2012, 8 pages.
"Flexible Archiving", Published on: Apr. 3, 2015 Available at: http://www.mailstore.com/en/mailstore-server-features-archiving.aspx.
Perkio, et al., "Multi-Faceted Information Retrieval System for Large Scale Email Archives", In Proceedings of the IEEE/WIC/ACM International Conference on Web Intelligence, Sep. 19, 2005, 8 pages.
U.S. Appl. No. 62/130,475, Srinivasan, et al., "Large Data Management in Communication Applications through Multiple Mailboxes", filed Mar. 10, 2015.
"Second Written Opinion Issued in PCT Application No. PCT/US2016/021415", dated Nov. 2, 2016, 8 Pages.
"Non Final Office Action Issued in U.S. Appl. No. 14/737,454", dated Mar. 6, 2019, 21 Pages.
"Summons to Attend Oral Proceedings Issued in European Patent Application No. 16710620.2", Mailed Date: Feb. 21, 2019, 9 Pages.
"Summons to Attend Oral Proceedings Issued in European Patent Application No. 16711454.5", Mailed Date: Mar. 12, 2019, 9 Pages.

\* cited by examiner

ARCHITECTURE FOR LARGE DATA MANAGEMENT IN COMMUNICATION APPLICATIONS THROUGH MULTIPLE MAILBOXES

BACKGROUND

Communication applications enable two or more users to communicate electronically using multiple modes of communication such as email, text messaging, media exchange, audio communication, video communication, desktop sharing, data sharing, application sharing, and similar modes. Some communication applications include additional functionality such as scheduling, contact list management, task management and comparable ones. Items such as emails, exchanged text messages, contacts, calendar items, etc. may be saved in special storage containers called mailboxes. Due to the increase in the used communication modes, shared amounts of data, and expansion of electronic communications, data generated by the communication applications may reach large amounts fairly rapidly. Due to design considerations, memory limitations, and other factors, mailboxes are typically limited to predefined capacities, however.

For example, in some email applications, user mailboxes may be limited to 100 or 200 GB. Some communication applications may provide a primary mailbox and an online archive mailbox, where older items may be moved from the primary mailbox. However, the archive mailboxes typically have similar size limitations as primary mailboxes. Thus, users generating large amounts of communication data may hit the limits fast degrading their user experience. Conventional solutions include manual or automatic export of data from the communication application to other data storages (e.g., regular file folders), but such exported data is usually not readily available to the communication application making this type of remedy not satisfactory for users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing an infrastructure for large data management in a communication application through multiple mailboxes. In some examples, a generic storage may be provided for serialized mailbox information associated with one or more additional mailboxes, where the one or more additional mailboxes are created upon detection of a predefined size threshold of a mailbox associated with a user being reached. Storage and retrieval of communication application related data may then be enabled in the one or more additional archive mailboxes for one or more functionalities of the communication application in a transparent manner to the user through an application programming interface (API) that uses the generic storage for serialized mailbox information.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
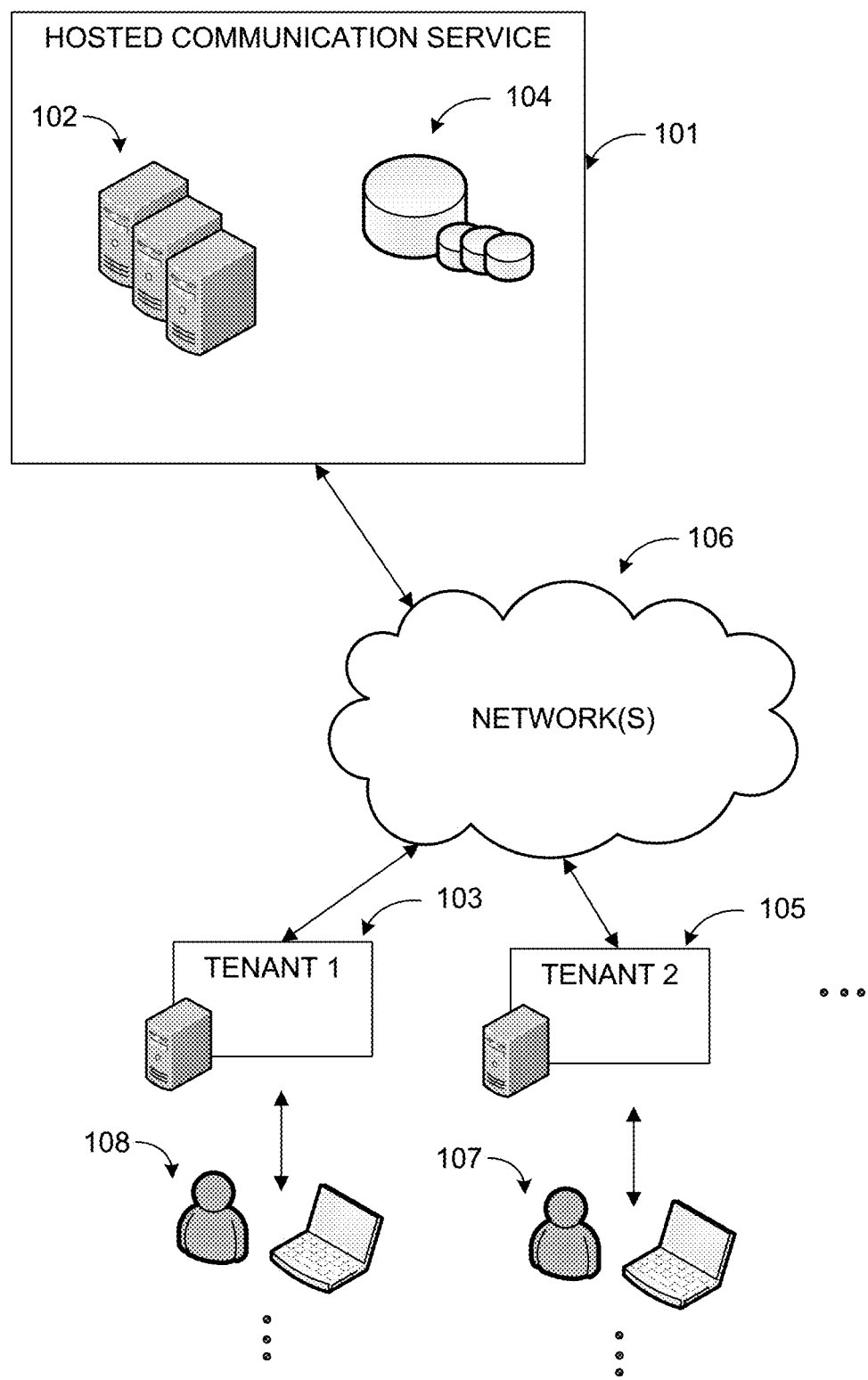
FIG. 1A through 1D illustrate example configurations in implementation of large data management in a communication application through multiple mailboxes.

As briefly described above, data limit for a user may be increased by introducing additional archive mailboxes as the original archive fills up or subsequently added archive mailboxes fill up. Thus, a user's data limit may be effectively removed through the use of additional archive mailboxes. The additional mailboxes may be integrated into the architecture of the communication application such that their use is transparent to the user and/or an administrator of the communication application or associated service through the use of an application programming interface (API) that exposes a single multivalued strongly typed collection instead of dealing with multiple attributes and extending the schema every time a new type needs to be added. A mailbox locations attribute may act as the main storage of serialized mailbox locations and a mailbox identifier attribute may be used for indexing.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a communication application or service with mailboxes to store data. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1A through 1D illustrate example configurations in implementation of large data management in a communication application through multiple mailboxes.

A hosted communication service 101, as shown in FIG. 1A, may be executed in one or more datacenters including any number of servers 102 and special purpose computing devices and facilitate email exchange, messaging, online conferencing, audio communication, video communication, data sharing, application sharing, desktop sharing, and similar communication modes. The communication service 101 may be accessed by multiple tenants (e.g., tenant 1 103, tenant 2 105, etc.) over one or more networks 106 and the communication services may be consumed by users 107 and 108 of the respective tenants. Data associated with any of the facilitated communication modes may be stored in data stores 104 and/or local data storage using mailboxes as discussed herein.

Figure 1B:
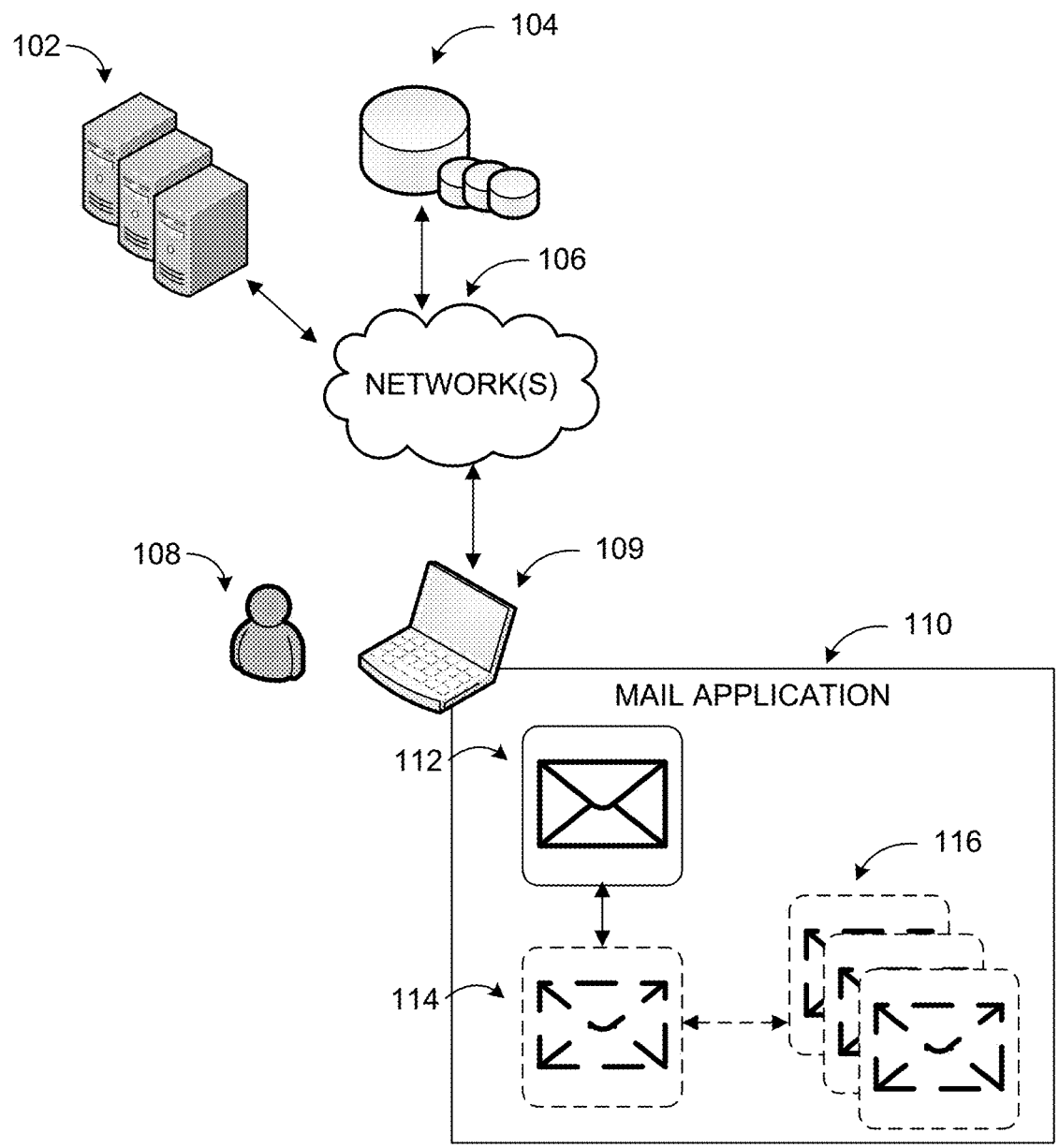

FIG. 1B shows a specific implementation example, where the communication service is implemented on one or more servers 102 and facilitates communications between users (or subscribers) such as user 108 over one or more networks 106. The communication service may be accessed through thin clients such as web browsers on individual client devices or through thick clients (locally installed applications with more capabilities) such as mail application 110 on computing device 109. Some or all of the data associated with the service may be stored in data stores 104 and/or local data stores on client devices. While mail application 110 is used as an example client application herein, embodiments are not limited to emails.

A communication service according to embodiments may achieve "unlimited" storage for a single user by chaining mailboxes together. A normal user with, for example, less than 100 GB of data overall may either have just one primary mailbox 112 or have one primary mailbox 112 and one archive mailbox 114. The first archive mailbox 114 may be referred to as the archive "hierarchy" mailbox. However, when a user crosses over the predefined limit, they may end up having one primary mailbox 112, one archive "hierarchy" mailbox 114, and one or many archive "content" mailboxes 116.

Although the "archive" includes the hierarchy and content mailboxes, for a user it may appear as one single mailbox. For example, the user may see two nodes: one node for the primary mailbox 112 and one node for the "archive" (first archive mailbox 114 and additional "content" mailboxes 116). The user may have access to all the folders that the user created and the ones that the user imported along with system folders like Inbox and Sent Items.

When a communication application client requests content from a folder in any archive mailbox, the underlying service may provide that content if it is in the current archive mailbox as shown in the diagram. If the content is not in the mailbox, the service may provide a pointer to the mailbox and folder containing it. Allowing the client to directly request content from the appropriate mailbox, which could be on a different database/server than other archive mailboxes, may respect the tenets of brick architecture by avoiding server-side fan out calls.

The complete folder hierarchy may be stored in the archive "hierarchy" and the archive "content" mailboxes. In some cases, the archive hierarchy mailbox may have the "writable" most recent copy of the folder hierarchy. The folder hierarchy in the archive content mailboxes may be updated periodically using a synchronization process. The end user, when accessing the "archive", may connect only to the archive hierarchy mailbox. From there, all folder/content requests may be redirected appropriately.

Figure 1C:
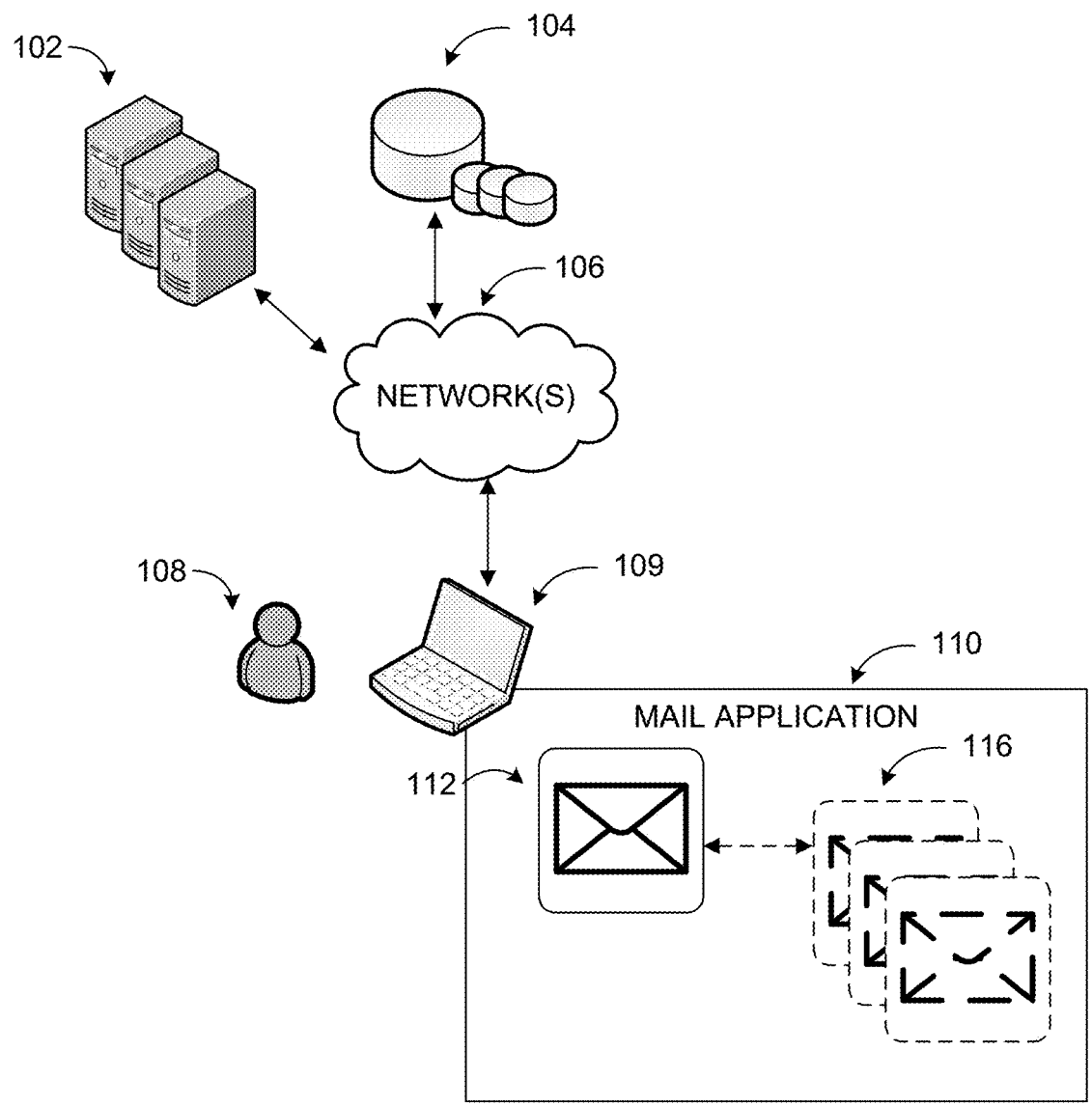
Figure 1D:
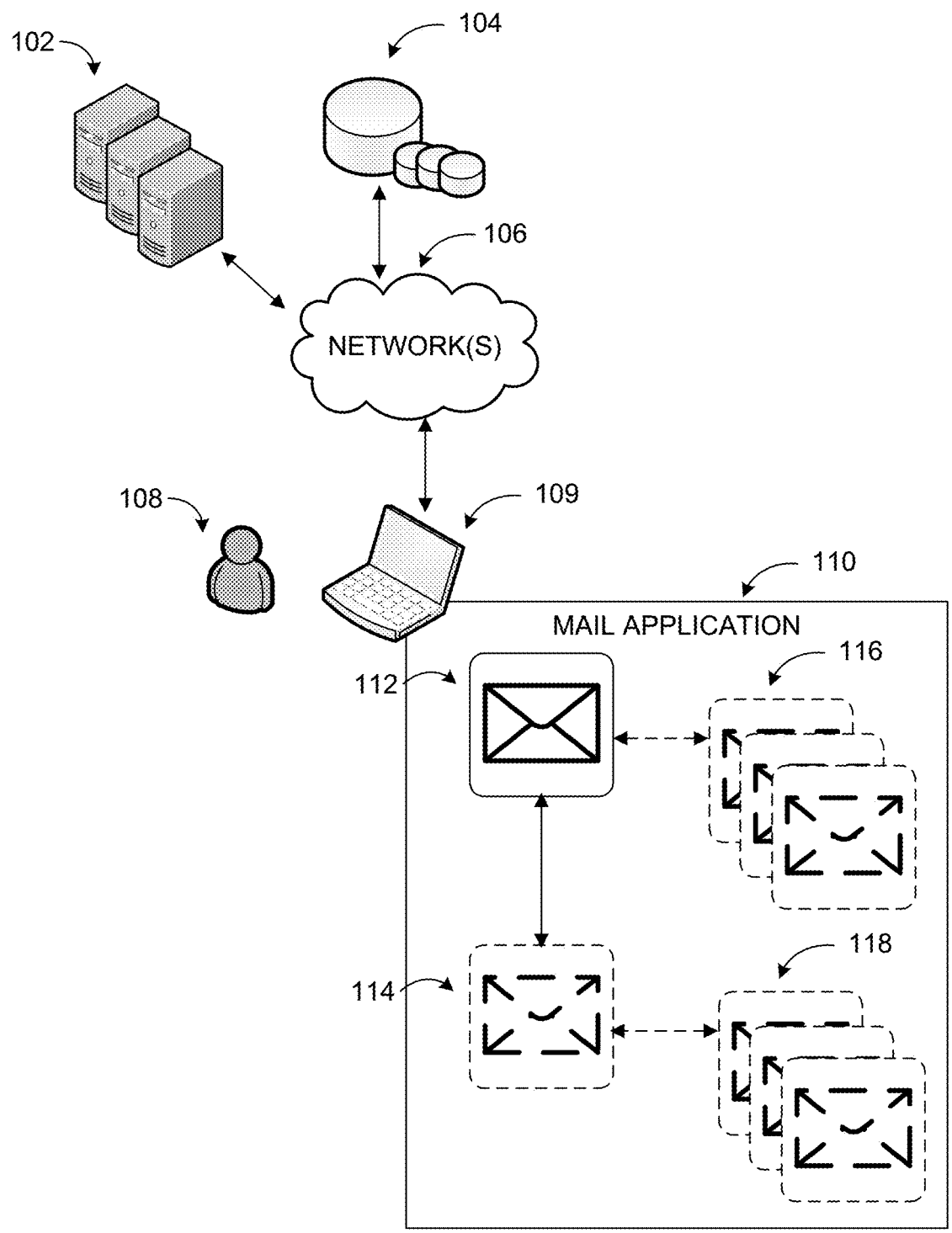

In the example configuration of FIG. 1B, the additional mailboxes 116 are chained to the first archive mailbox 114 in a transparent manner to the user 108. Embodiments are not limited to this example configuration, however. FIGS. 1C and 1D below illustrate additional configurations.

In the example configuration of FIG. 1C, the mail application 110 is configured with a primary mailbox (cached) 112 and the additional archive mailboxes 116 are chained directly to the primary mailbox 112. The first one of the additional archive mailboxes 116 may be configured to contain the hierarchy information as described above.

The auto-split or data partitioning process may include chaining of partitions created on the fly based on mailbox size, items counts, and/or ingestion size. A size limit for the homogeneous partitions may be selected to ensure optimal performance. Automatic size balancing and search across multiple partitions may be enabled. Moreover, folder based and other metadata based views across multiple partitions may be provided. The system may intelligently and securely determine partition where requested data resides. Partitions may be directly targeted by ingestion systems. The system may take care of intelligently distributing data to ensure individual partition limits are respected. The partitioning may be transparent to compliance management processes. Electronic discovery may be enabled to obtain knowledge of all user partitions from the system to return results from all owned partitions securely. Hold, records management, and comparable policies may be aware of all partitions of the user and maintain service level agreements.

In the example configuration of FIG. 1D, the mail application 110 is configured with a primary mailbox (cached) 112 and an archive mailbox 114. In this case, both the primary mailbox 112 and the archive mailbox 114 are chained with respective additional archive mailboxes 116 and 118. Thus, additional mailboxes and partitioning may be performed in a number of different configurations in a transparent manner to the user.

Figure 2:
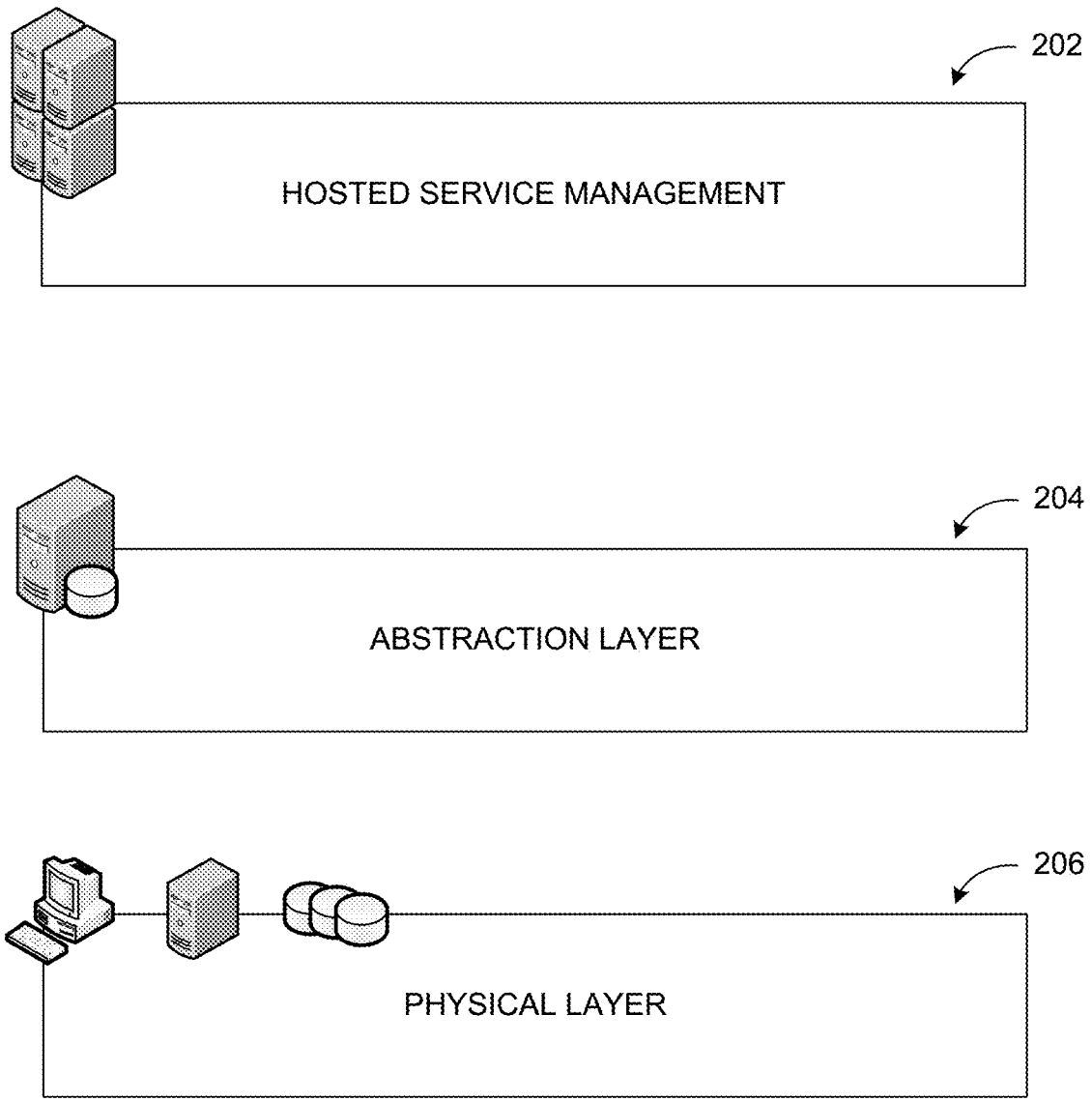
FIG. 2 illustrates layers of an example system for implementation of large data management in a communication application through multiple mailboxes.

FIG. 2 illustrates layers of an example system implementing large data management through multiple mailboxes.

Physical layer 206 may include the data storage (local or online) that physically stores the data compartmentalized and contained in mailboxes as discussed herein. The physical layer 206 may also include computing devices executing client applications, servers executing the underlying communication service, etc.

The abstraction layer 204 may include the database that stores the mailbox information and allow a generic way to request mailbox locations of any given type for a given directory object (e.g., group mailboxes). The abstraction layer may also enable maintenance and balancing of the mailboxes, as well as, allow a generic way to manage mailbox locations regardless of mailbox type. For example, all mailboxes that meet a particular criteria may be load balanced regardless of their nature and the attributes used to store that location on a directory entry.

The hosted service management layer 202 may provide management functionality for various aspects of the communication service including addition of mailboxes as existing ones reach predefined thresholds.

Figure 3A:
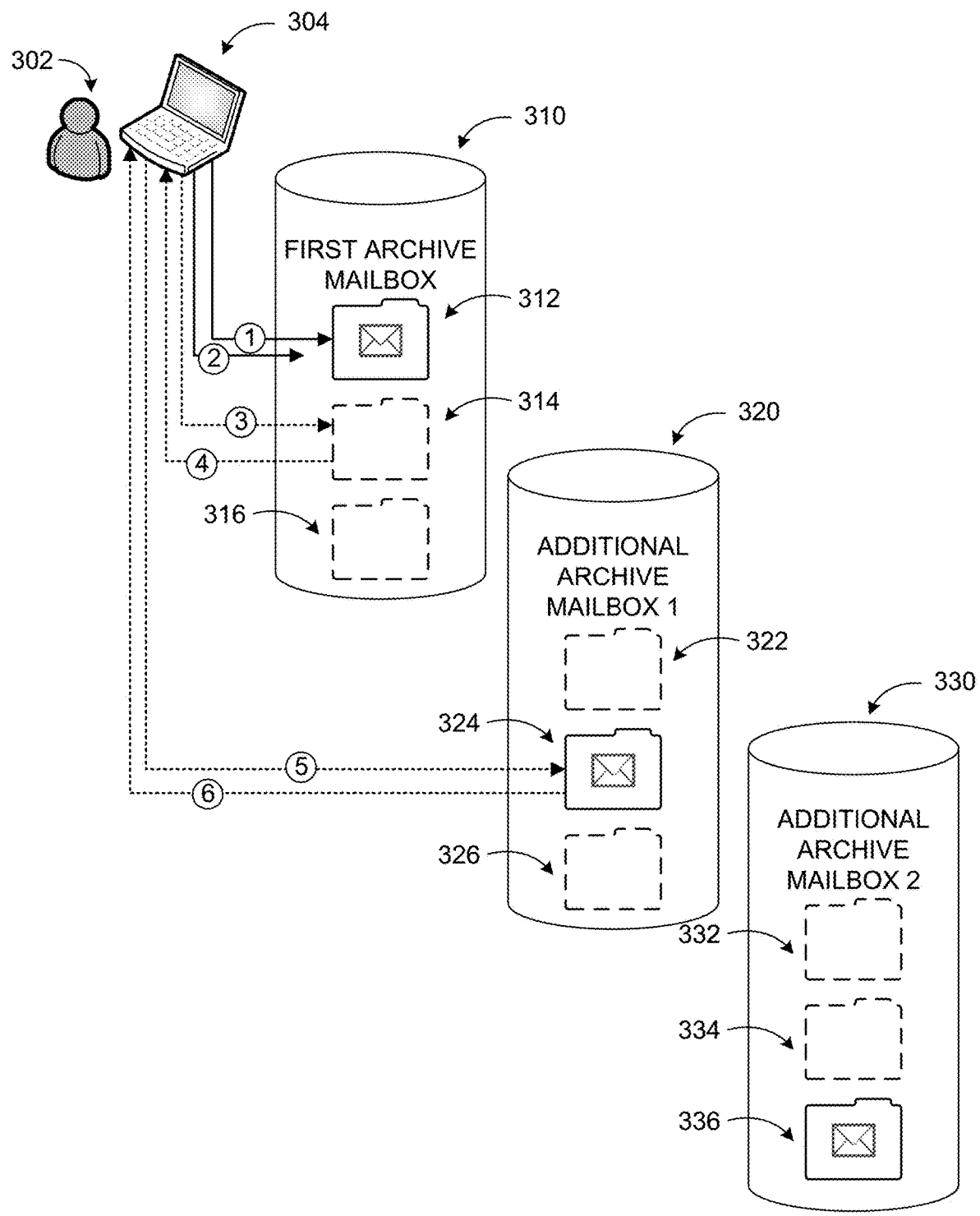
FIGS. 3A and 3B illustrate example operations on a communication system with multiple mailboxes.
Figure 3B:
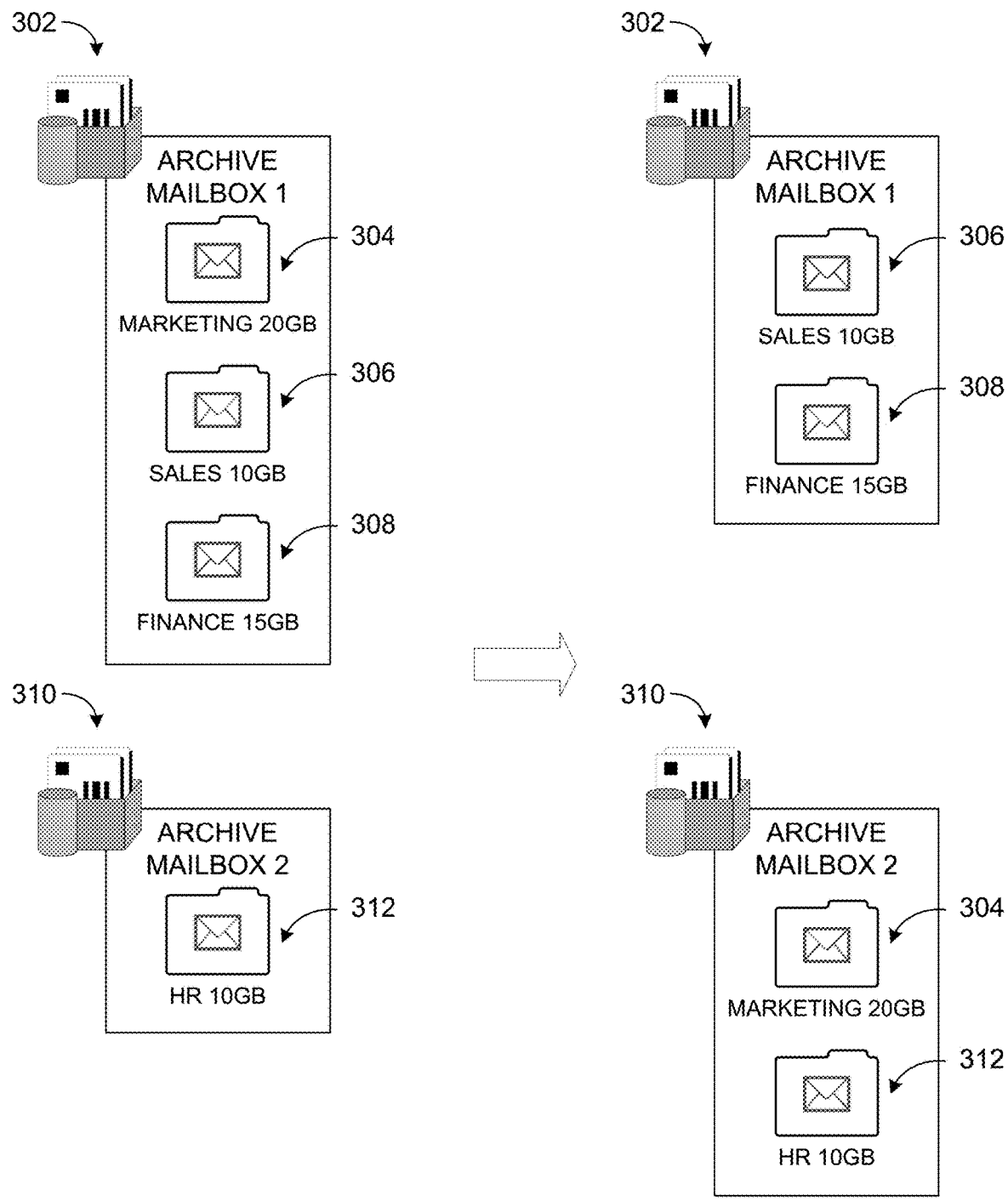

FIGS. 3A and 3B illustrate example operations on a communication system with multiple mailboxes.

As discussed previously, the additional (or extension) mailboxes may be implemented in a transparent manner to the user, where items such as folders may be stored in various mailboxes with pointers to those in other mailboxes being placed in the primary mailbox or the first archive mailbox. Thus, a user may click on a folder that exists in a different mailbox and open the folder and see its contents without a noticeable difference.

In the example configuration of FIG. 3A, a user 302 may have a first archive mailbox 310 and two additional archive mailboxes 320, 330. When a client application on computing device 304 requests content from a folder in any archive mailbox, the communication service may provide that content if it is in the first archive mailbox 310 as shown by client-server interactions 1 and 2 in the diagram for folder 312. If the content is not in the first archive mailbox 310, as in "ghosted" folder 314, the communication service may provide a pointer to the mailbox (additional archive mailbox 320) and folder 324 containing the content as shown by client-server interactions 3, 4, 5, and 6. Folders with content may be in any mailbox such as folder 336 in additional archive mailbox 330. Ghosted versions of the actual content folders may be created in other mailboxes (e.g., ghosted folders 316, 322, 326, 332, 334) for redundancy and efficiency purposes.

When any one of the archive hierarchy/content mailbox reaches the mailbox quota, one or few of the folders in the mailbox may be moved to the other archive "content" mailboxes through an "auto-split" process, thereby freeing up space for growth. The auto-split threshold may be at the tenant level, in some implementations.

FIG. 3B shows an example auto-split process, where a user's two archive mailboxes 302 and 310 have initially a folder distribution of 45 GB and 10 GB, respectively. Assuming, for example, the quota for that user's individual archive mailboxes is 50 GB, the auto-split process may move marketing folder 304 from the first archive mailbox 302 to the second archive mailbox 310 leaving sales folder 306 and finance folder 308 in the first archive mailbox 302 and marketing folder 304 and HR folder 312 in the second archive mailbox 310. Thus, the new distribution may be 25 GB and 30 GB in respective archive mailboxes providing a load balanced folder storage.

Instead of dealing with multiple attributes (and extending the schema every time a new type needs to be added), a system according to embodiments may expose a single multivalued strongly typed collection (e.g., called MailboxLocations). Below is an example of a main interface that may be used in the APIs:

```
interface IMailboxLocationInfo
{
    Guid   MailboxGuid;
    ADObjectId DatabaseLocation;
    MailboxLocationType MailboxLocationType
}
```

Following is an example of mailbox type definition which may or may not be included in the mailbox location information interface.

```
enum MailboxLocationType
{
    Primary = 0,
    MainArchive = 1,
    AuxArchives = 2,
}
```

Following is an example definition of a main collection class:

```
public class MailboxLocationCollection
{
    IList<1MailboxLocation> GetMailboxLocations(MailboxLocationType
    mailboxLocationType);
    IMailboxLocation GetMailboxLocation(Guid mailboxGuid);
    void AddMailboxLocation(IMailboxLocation mailboxLocation.
    MailboxLocationType mailboxLocationType);
    void AddMailboxLocation(Guid mailboxGuid, ADObjected
    databaseLocation,
    MailboxLocationType mailboxLocationType);
    void RemoveMailboxLocation(Guid mailboxGuid);
}
```

The collection may be built on top of an existing multi valued property class to take advantage of the change tracking, but not allowing the callers to add/remove entries directly bypassing validation. The MailboxLocations ADPropertyDefinition may be available on all recipient classes in some examples.

In some embodiments, a call using the GUID may be able to locate mailboxes of any type. StoreMailboxLocation abstraction may simplify mailbox maintenance and load balancing. This abstraction may implement IMailboxLocationInfo interface and may also have an identity that may make possible management via cmdlets and Id persistence in move requests (for folders or mailboxes). An example StoreMailboxLocation object may look like:

```
class StoreMailboxLocation : ConfigurableObject, IMailboxLocationInfo
{
    StoreMailboxId Id:
    Guid MailboxGuid;
    ADObjectId DatabaseLocation;
    ADRecipient GetOwner( );
}
```

The GetOwner( ) may get the user/group/any other directory entity associated with that particular mailbox. StoreMailboxId may identify the particular mailbox for search and other operations. To retrieve and commit, following example internal interface may be used:

```
Internal interface IRecipientSession
{
    void Save(StoreMailboxLocation StoreMailboxLocation) {...}
    StoreMailboxLocation FindStoreMailboxLocationById(StoreMailboxId
    storeMailboxId) {...}
}
```

The 'Save' and FindStoreMailboxLocationById may be part of IRecipientSession interface so that they are available for TenantRecipientSession and ADOrganizationRecipientSession. The Save method may take the StoreMailboxLocation and update the DatabaseLocation on the directory service user (ADUser) who owns the mailbox. The FindStoreMailboxLocationById may retrieve the mailbox information given the StoreMailboxId (tenant partition hint and the mailbox guid). A StoreMailboxIdParameter may allow cmdlets to find a MailboxLocation for a particular directory service user. The StoreMailboxIdParamter may accept the inputs as RecipientIdParameter and may return the information about primary mailbox information in some examples. In other examples, all MailboxLocationType may be appended to the RecipientIdParameter and for mailbox type that a user may have multiple mailboxes of, the cmdlet may return StoreLocationMailbox information about all of them.

As mentioned above, a generic storage for mailbox location information may be provided instead of adding a new attribute for every new type of mailbox. Because database pointers are soft links, separate distinguished name object linked attributes may not be needed/used. Thus, mailbox-related information for a given mailbox may be combined in a single string using the following semicolon-delimited format:

{MailboxGuid;MailboxType;DatabaseForestFqdn;DatabaseObjectGuid}

Two additional directory service attributes may be used, one for mailbox locations, the other for mailbox GUIDs. The first attribute may be the main storage of serialized mailbox locations as described above. It may not be a string type because multivalued attributes replicate as a whole and simultaneous change of multiple values may result in data loss. Thus, links may be used, where every value is replicated independently. The mailbox locations attribute may also carry some binary payload that includes the serialized mailbox location string (e.g., one mailbox location per value). The resulting values of the mailbox locations attribute may not be indexable, but the mailbox GUIDs attribute, which may be a multivalued string, may be used to index the mailbox GUIDs. The mailbox GUIDs attribute may be updated whenever an entry is added to or removed from the mailbox locations attribute, and may not be modified during mailbox moves so the probability data loss is greatly reduced. To mitigate potential data loss, object-level validation may be used, which may occur on every object read.

When a folder is moved, the communication application may be able to simply update the view and show the moved folder and its constituents under the target folder within an acceptable amount of time. Multiple folders selection may possible and move operations of multiple folders may be supported. If a user tries to move a small number of items/items of small size, cross server operations through the client may be fast and complete quickly. If a user tries to move a large number of items/items of large size, cross server operations through the client may not be fast. In such a scenario, a message to the user may be displayed letting them know that the operation has been queued and may complete within a particular time (depending on the size of items being moved, other operations on mailbox, store health, network health etc.). During the time that the operation is queued, if the user makes changes to the source list (like adding an item or deleting an item), the changes may be ignored, prevented, or considered. Once a move is queued, another move/copy on the same set of items/subset of items may fail with a message to the user indicating a different move is already queued and they have to wait until it completes.

Copy operations may be treated similar to move operations as described above. When a new folder is created, the view may be updated to reflect the new folder, which may inherit the permissions of the parent folder. Creation of the new folder may be performed through a hierarchy update operation.

Deleted items may be moved to a designated deleted items container, from which they may be recoverable. If items are recovered from the deleted items container, they may be moved back to their original location (folder).

The example scenarios and schemas in FIG. 1A through 3 are shown with specific components, data types, and configurations. Embodiments are not limited to systems according to these example configurations. Providing large data management in a communication application through multiple mailboxes may be implemented in configurations employing fewer or additional components in applications and user interfaces. Furthermore, the example schema and components shown in FIG. 1A through 3 and their subcomponents may be implemented in a similar manner with other values using the principles described herein.

The technical advantages of providing an infrastructure for large data management in a communication application through multiple mailboxes may include increased efficiency in network usage, reduced processor usage (reducing need to access exported data), improved user efficiency, and improved user interaction performance by allowing management of large amounts and variety of communication related data without extra steps to access the data.

Figure 4:
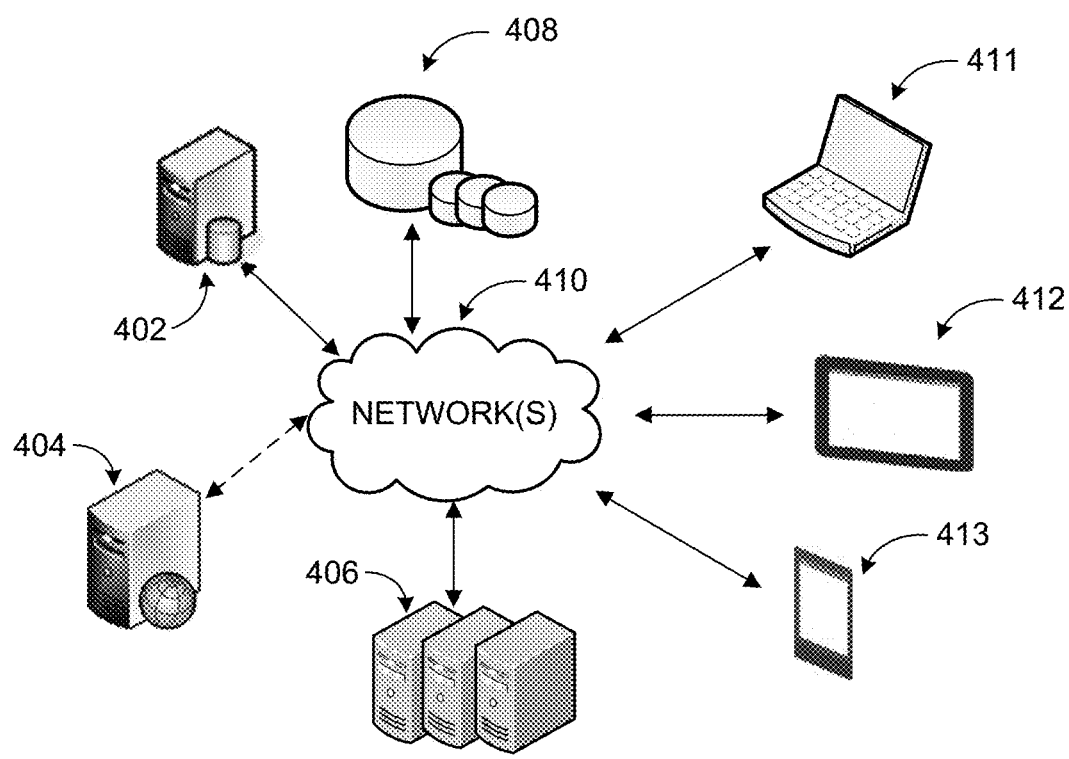
FIG. 4 is a simplified networked environment, where a system according to embodiments may be implemented.

FIG. 4 is an example networked environment, where embodiments may be implemented. A communication application or service configured to manage large amounts of data through the use of multiple mailboxes in a transparent manner to the user may be implemented via software executed over one or more servers 406 such as a hosted service. The platform may communicate with client applications on individual computing devices such as a smart phone 413, a mobile computer 412, or desktop computer 411 ('client devices') through network(s) 410.

Client applications executed on any of the client devices 411-413 may facilitate communications via application(s) executed by servers 406, or on individual server 404. The communication application or service may configure as many as needed archive mailboxes. The additional mailboxes may be integrated into the architecture of the communication application such that their use is transparent to the user and/or an administrator of the communication application or associated service. The communication application or service may store the item in data store(s) 408 directly or through database server 402.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide management of large amounts of data in communication applications through the use of multiple mailboxes in a transparent manner to the user. Furthermore, the networked environments discussed in FIG. 4 are for illustration purposes only. Embodiments are not limited to the example applications, modules, or processes.

Figure 5:
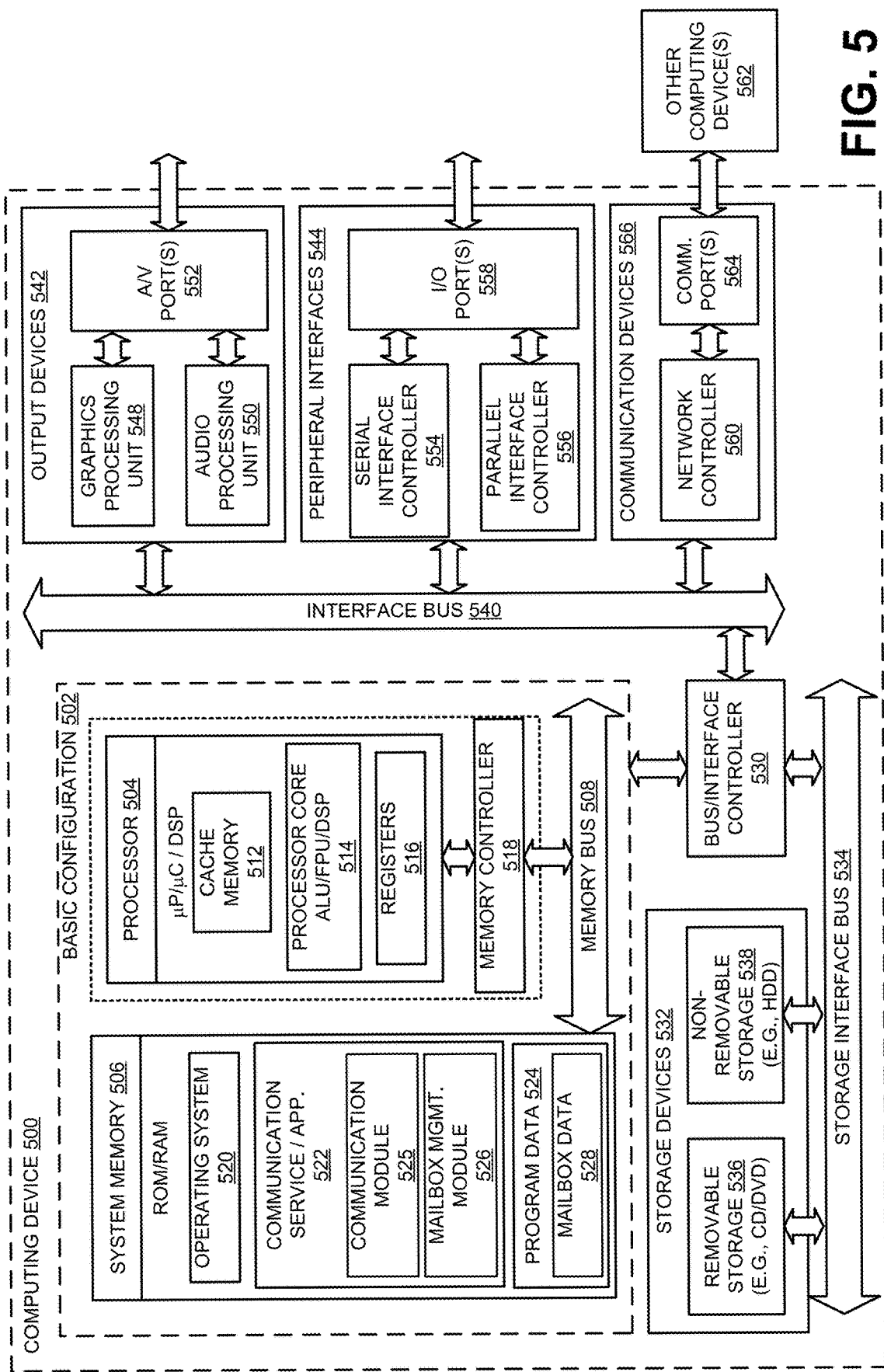
FIG. 5 is a block diagram of an example computing device, which may be used to implement an infrastructure for large data management in a communication application through multiple mailboxes.

FIG. 5 is a block diagram of an example computing device, which may be used to implement large data management in a communication application through multiple mailboxes.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication service/application 522, and program data 524. The communication service/application 522 may include a communication module 525 to facilitate communication among users in a variety of modes and a mailbox management module 526 to increase data limit for a user by introducing additional archive mailboxes as the original archive fills up or subsequently added archive mailboxes fill up. The additional mailboxes may be integrated into the architecture of the communication application such that their use is transparent to the user and/or an administrator of the communication application/service 522. The mailbox management module 526 may also be referred to as a data management application. The program data 524 may include, among other data, mailbox data 528 that may be used to facilitate communications, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O, ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may also be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide an infrastructure for management of large amounts of data in communication applications through the use of multiple mailboxes in a transparent manner to the user. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
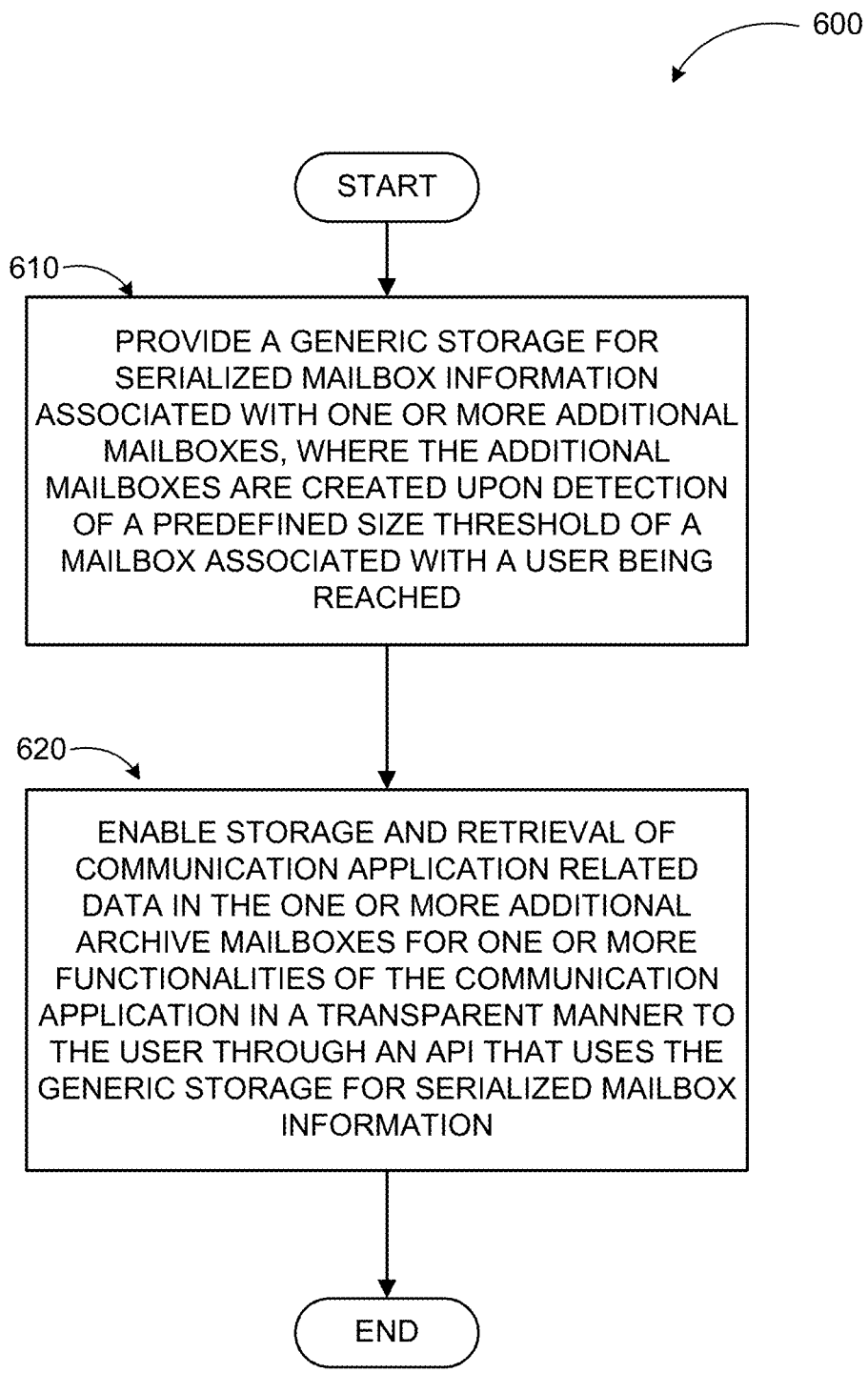
FIG. 6 illustrates a logic flow diagram of a method to provide large data management in a communication application through multiple mailboxes, according to embodiments.

FIG. 6 illustrates a logic flow diagram of a method to provide large data management in a communication application through multiple mailboxes, according to embodiments. Process 600 may be implemented on a computing device such as the computing device 500 or other system.

Process 600 begins with operation 610, where a generic storage for serialized mailbox information associated with one or more additional mailboxes may be provided. The one or more additional mailboxes may be created upon detection of a predefined size threshold of a mailbox associated with a user being reached.

At operation 620, storage and retrieval of communication application related data may be enabled in the one or more additional archive mailboxes for one or more functionalities of the communication application in a transparent manner to the user through an API that uses the generic storage for serialized mailbox information.

The operations included in process 600 are for illustration purposes. An infrastructure for management of large amounts of data in communication applications through the use of multiple mailboxes in a transparent manner to the user may be implemented by similar processes with fewer or additional steps, as well as in different order of operations using the principles described herein.

According to some examples, a method executed on a computing device to provide an infrastructure for large data management in a communication application through multiple mailboxes is described. The method may include providing a generic storage for serialized mailbox information associated with one or more additional mailboxes, where the one or more additional mailboxes are created upon detection of a predefined size threshold of a mailbox associated with a user being reached; and enabling storage and retrieval of communication application related data in the one or more additional archive mailboxes for one or more functionalities of the communication application in a transparent manner to the user through an application programming interface (API) that uses the generic storage for serialized mailbox information.

According to other examples, the method may further include exposing a single multivalued strongly typed collection to access the one or more additional archive mailboxes through the API. The single multivalued strongly typed collection may include a mailbox identifier attribute, a database location attribute, and a mailbox location type attribute. The method may also include enabling a call using the mailbox identifier attribute to locate a mailbox of any type and/or employing a mailbox location attribute as main storage of serialized mailbox locations, where the mailbox location attribute has a value that includes links. The mailbox location attribute may further include a binary payload with a serialized mailbox location string.

According to further examples, the method may also include employing the mailbox identifier attribute for indexing, where the mailbox identifier attribute is a multivalued string. The method may further include updating the mailbox identifier attribute in response to an entry being added to or removed from the mailbox locations attribute and preventing the mailbox identifier attribute from being modified during mailbox moves to reduce a probability of data loss. The method may also include employing object level validation to mitigate the data loss.

According to other examples, a computing device to provide an infrastructure for large data management in a communication application through multiple mailboxes is described. The computing device may include a memory configured to store instruction associated with the communication service and one or more processors configured to execute one or more applications associated with the communication service in conjunction with the instructions stored in the memory. The one or more applications may include a communication application configured to facilitate exchange of communication in a plurality of modes between users and a data management application configured to manage communication application related data through mailboxes associated with the users and user groups, The data management application may be further configured to provide a generic storage for serialized mailbox information associated with one or more additional mailboxes, where the one or more additional mailboxes are created upon detection of a predefined size threshold of a mailbox associated with a user being reached; and enable storage and retrieval of communication application related data in the one or more additional archive mailboxes for one or more functionalities of the communication application in a transparent manner to the user through an application programming interface (API) that exposes a single multivalued strongly typed collection to access the one or more additional archive mailboxes.

According to some examples, the data management application may be further configured to enable use of cmdlets to find a mailbox location for a particular directory service user; enable use of cmdlets to find multiple mailbox locations for a user associated with multiple mailboxes by appending multiple mailbox location type attributes to a search parameter; and/or employ a mailbox location attribute as main storage of serialized mailbox locations, where the mailbox location attribute has a value that includes links and a binary payload with a serialized mailbox location string.

According to other examples, the data management application may be further configured to employ the mailbox identifier attribute for indexing, where the mailbox identifier attribute is a multivalued string and the mailbox identifier attribute is updated in response to an entry being added to or removed from the mailbox locations attribute; and create, modify, and maintain objects associated with the single multivalued strongly typed collection at an abstraction layer. The communication application related data may include one or more of emails, calendar items, attachments, tasks, contact cards, online conference recordings, audio communication recordings, video communication recordings, and text messages. The plurality of modes may include one or more of an email exchange, a messaging exchange, an online conference, an audio communication, a video communication, a data sharing session, an application sharing session, and a desktop sharing session.

According to further examples, a computer-readable memory device with instructions stored thereon to provide an infrastructure for large data management in a communication application through multiple mailboxes is described. The instructions may include providing a generic storage for serialized mailbox information associated with one or more additional mailboxes, where the one or more additional mailboxes are created upon detection of a predefined size threshold of a mailbox associated with a user being reached; and enabling storage and retrieval of communication application related data in the one or more additional archive mailboxes for one or more functionalities of the communication application in a transparent manner to the user using an application programming interface (API) by exposing a single multivalued strongly typed collection to access the one or more additional archive mailboxes through the API, where the single multivalued strongly typed collection includes a mailbox identifier attribute, a database location attribute, and a mailbox location type attribute.

According to some examples, the instructions may also include creating pointers in a main archive mailbox for folders stored in the one or more additional archive mailboxes; redirecting calls to access content in the folders stored in the one or more additional archive mailboxes to respective ones of the one or more additional archive mailboxes; and/or automatically moving folders among available archive mailboxes to load balance stored data in relation to a designated storage quota for each mailbox.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide an infrastructure for large data management in a communication application through multiple mailboxes, the method comprising:
storing and retrieving data associated with the communication application to and from an archive, wherein the archive includes at least a first archive mailbox; and
in response to detecting a predefined size threshold of the first archive mailbox being reached based on an amount of the data stored within the first archive mailbox:
automatically creating an additional archive mailbox to store excess data from the first archive mailbox;
providing access to the data stored within the archive, including the first archive mailbox and the additional archive mailbox, through a single mailbox presented to a user by integrating the additional archive mailbox into the archive through an application programming interface (API) that exposes an interface parameter to access the first archive mailbox and the additional archive mailbox;
detecting a request for a portion of the data stored within the archive through the single mailbox; and
if the requested portion of the data is stored within the first archive mailbox, providing the requested portion of the data for display; else
redirecting the request from the first archive mailbox to the additional archive mailbox in a transparent manner using a pointer created in the first archive mailbox for the additional archive mailbox and a folder of the additional archive mailbox in which the requested portion of the data is stored.

2. The method of claim 1, wherein the interface parameter includes a mailbox identifier attribute, a database location attribute, and a mailbox location type attribute.

3. The method of claim 2, further comprising:
enabling a call using the mailbox identifier attribute to locate a mailbox of any type.

4. The method of claim 2, further comprising:
employing a mailbox location attribute as main storage of serialized mailbox locations, wherein the mailbox location attribute has a value that includes links.

5. The method of claim 4, wherein the mailbox location attribute further includes a binary payload with a serialized mailbox location string.

6. The method of claim 2, further comprising:
employing the mailbox identifier attribute for indexing, wherein the mailbox identifier attribute is a multivalued string.

7. The method of claim 6, further comprising:
preventing the mailbox identifier attribute from being modified during mailbox moves to reduce a probability of data loss.

8. The method of claim 7, further comprising:
employing object level validation to mitigate the data loss.

9. A computing device to provide an infrastructure for large data management in a communication application through multiple mailboxes, the computing device comprising:
a communication interface configured to facilitate exchange of a communication between one or more users associated with a communication service;
a memory configured to store instructions associated with the communication service; and
one or more processors configured to execute the communication application associated with the communication service in conjunction with the instructions stored in the memory, wherein the one or more processors are configured to:
store and retrieve data associated with the communication application to and from an archive, wherein the archive includes at least a first archive mailbox; and
in response to detecting a predefined size threshold of the first archive mailbox being reached based on an amount of the data stored within the first archive mailbox:
automatically create an additional archive mailbox to store excess data from the first archive mailbox;
provide access to the data stored within the archive, including the first archive mailbox and the additional archive mailbox, through a single mailbox presented to a user by integrating the additional archive mailbox into the archive through an application programming interface (API) that exposes an interface parameter to access the first archive mailbox and the additional archive mailbox;
detect a request for a portion of the data stored within the archive through the single mailbox; and
if the requested portion of the data is stored within the first archive mailbox, provide the requested portion of the data for display; else
redirect the request from the first archive mailbox to the additional archive mailbox in a transparent manner using a pointer created in the first archive mailbox for the additional archive mailbox and a folder of the additional archive mailbox in which the requested portion of the data is stored.

10. The computing device of claim 9, wherein the one or more processors are further configured to:
enable use of cmdlets to find a mailbox location for a particular directory service user.

11. The computing device of claim 10, wherein the one or more processors are further configured to:
enable use of cmdlets to find multiple mailbox locations for a user associated with multiple mailboxes by appending multiple mailbox location type attributes to a search parameter.

12. The computing device of claim 9, wherein the one or more processors are further configured to:
employ a mailbox location attribute as main storage of serialized mailbox locations, wherein the mailbox location attribute has a value that includes links and a binary payload with a serialized mailbox location string.

13. The computing device of claim 12, wherein the one or more processors are further configured to:
employ the mailbox identifier attribute for indexing, wherein the mailbox identifier attribute is a multivalued string and the mailbox identifier attribute is updated in response to an entry being added to or removed from the mailbox locations attribute.

14. The computing device of claim 9, wherein the one or more processors are further configured to:
create, modify, and maintain objects associated with the single multivalued strongly typed collection at an abstraction layer.

15. The computing device of claim 12, wherein the data includes one or more of emails, calendar items, attachments, tasks, contact cards, online conference recordings, audio communication recordings, video communication recordings, and text messages.

16. The computing device of claim 9, wherein the communication interface is configured to facilitate exchange of the communication in a plurality of modes between the one or more users associated with the communication service, wherein the plurality of modes include one or more of an email exchange, a messaging exchange, an online conference, an audio communication, a video communication, a data sharing session, an application sharing session, and a desktop sharing session.

17. A computer-readable memory device with instructions stored thereon to provide an infrastructure for large data management in a communication application through multiple mailboxes, the instructions comprising:
storing and retrieving data associated with the communication application to and from an archive, wherein the archive includes at least a first archive mailbox; and
in response to detecting a predefined size threshold of the first archive mailbox being reached based on an amount of the data stored within the first archive mailbox:
automatically creating an additional archive mailbox to store excess data from the first archive mailbox;
providing access to the data stored within the archive, including the first archive mailbox and the additional archive mailbox, through a single mailbox presented to a user by integrating the additional archive mailbox into the archive through an application programming interface (API) that exposes an interface parameter to access the first archive mailbox and the additional archive;
detecting a request for a portion of the data stored within the archive through the single mailbox; and
if the requested portion of the data is stored within the first archive mailbox, providing the requested portion of the data for display; else
redirecting the request from the first archive mailbox to the additional archive mailbox in a transparent manner using a pointer created in the first archive mailbox for the additional archive mailbox and a folder of the additional archive mailbox in which the requested portion of the data is stored.

18. The computer-readable memory device of claim 17, wherein the instructions further comprise:
automatically moving folders among the first archive mailbox and the additional archive mailbox to load balance stored data in relation to a designated storage quota for each mailbox.

* * * * *